United States Patent
Fazeli et al.

(10) Patent No.: US 9,915,314 B2
(45) Date of Patent: Mar. 13, 2018

(54) SHOCK STRUT FLUID ADJUSTMENT ASSISTING SYSTEM

(71) Applicant: Goodrich Corporation, Charlotte, NC (US)

(72) Inventors: Amir Fazeli, Milton, CA (US); Adnan Cepic, Mississauga (CA); Susanne Reber, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/934,924

(22) Filed: Nov. 6, 2015

(65) Prior Publication Data

US 2017/0130797 A1    May 11, 2017

(51) Int. Cl.

| B64F 5/40 | (2017.01) |
|---|---|
| F16F 9/32 | (2006.01) |
| B64C 25/60 | (2006.01) |
| B64F 5/00 | (2017.01) |
| G01M 17/04 | (2006.01) |
| B64F 5/60 | (2017.01) |

(52) U.S. Cl.
CPC ............ *F16F 9/3271* (2013.01); *B64C 25/60* (2013.01); *B64F 5/0081* (2013.01); *B64F 5/60* (2017.01); *G01M 17/04* (2013.01); *F16F 2230/46* (2013.01)

(58) Field of Classification Search
CPC ... F16F 9/3271; F16F 2230/46; B64F 5/0081; B64C 25/60
See application file for complete search history.

(56) References Cited

U.S. PATENT DOCUMENTS

| 2,955,628 | A | 10/1960 | Patterson | |
|---|---|---|---|---|
| 5,148,896 | A | 8/1992 | Ralph | |
| 7,322,190 | B2 | 1/2008 | Bair | |
| 7,756,717 | B2 | 7/2010 | Dayal | |
| 8,459,590 | B2* | 6/2013 | DeVlieg | B64C 25/001 |
| | | | | 244/102 SS |
| 8,565,968 | B2* | 10/2013 | Nance | G01M 17/04 |
| | | | | 244/100 R |
| 9,045,237 | B2 | 6/2015 | Nance | |
| 9,562,584 | B2* | 2/2017 | Schmidt | F16F 9/3264 |
| 2007/0069072 | A1 | 3/2007 | Luce | |
| 2008/0033607 | A1* | 2/2008 | Zeliff | B64D 45/0005 |
| | | | | 701/31.4 |
| 2008/0093173 | A1 | 4/2008 | James | |
| 2012/0053783 | A1 | 3/2012 | Nance | |
| 2014/0224007 | A1 | 8/2014 | Horabin | |
| 2015/0102933 | A1 | 4/2015 | Capraro | |
| 2015/0154819 | A1* | 6/2015 | Wilson | G01M 17/04 |
| | | | | 701/33.2 |

FOREIGN PATENT DOCUMENTS

JP      H11171097 A     6/1999

* cited by examiner

*Primary Examiner* — Jun Yoo
(74) *Attorney, Agent, or Firm* — Snell & Wilmer L.L.P.

(57) ABSTRACT

System and methods for servicing and monitoring shock struts are provided. A method for servicing a shock strut may include calculating a first fluid level; generating a first datum corresponding to the first fluid level; moving fluid into the shock strut in accordance with the first datum; calculating a second fluid level; generating a second datum corresponding to the second fluid level; and storing a final fluid level.

9 Claims, 9 Drawing Sheets

SHOCK STRUT FLUID ADJUSTMENT ASSISTING SYSTEM

FIELD

The present disclosure relates to landing gear, and more particularly, to systems and methods for increasing the serviceability of shock struts within landing gear.

BACKGROUND

Conventionally, various types of aircraft utilize shock strut assemblies to assist in reducing and managing energy transmitted from landing gear to the structure of an aircraft to which the landing gear is attached. Such shock strut assemblies often feature a piston that compresses a fluid within a sealed chamber. The fluid typically includes a gas segment and a liquid segment. Performance of the shock strut assembly may degrade over time. Such degradation can cause damage to other components of the aircraft, including bearings of the landing gear assembly. With typical single stage shock struts, the aircraft is lifted above the ground so that the shock strut can be in the fully extended position for servicing. Then, the shock strut may be cycled multiple times in attempt to fully remove any trapped gas internal to the shock strut during servicing. This can be time consuming and costly.

SUMMARY

A process for servicing a shock strut is provided. A process for servicing a shock strut may include: calculating a first fluid level; generating a first datum corresponding to the first fluid level; moving fluid into the shock strut in accordance with the first datum; calculating a second fluid level; generating a second datum corresponding to the second fluid level; and storing a final fluid level.

In various embodiments, the fluid may comprise at least one of oil or gas. The calculating the first fluid level may be performed by a controller. The generating the first datum may be performed by a controller. The calculating the second fluid level may be performed by a controller. The generating the second datum may be performed by a controller. The storing the final fluid level may be performed by a controller. The calculating the second fluid level may include using at least one of an initial fluid pressure, an initial fluid temperature, an initial shock strut stroke position, an updated fluid pressure, an updated fluid temperature, and an updated shock strut stroke position. The generating the first datum may be in response to at least one of a fluid volume loss or a fluid number of moles loss being more than or equal to a threshold value. The process for servicing the shock strut may allow for independent servicing of a gas in the shock strut and an oil in the shock strut. The storing the final fluid level may be in response to the second datum. The final fluid level may be calculated using at least one of a desired fluid level, the second fluid level, and a fluid level loss. A landing gear of an aircraft on which the shock strut may be mounted may be supported by at least one of a fixed surface or a jack during the process for servicing the shock strut.

A shock strut servicing assistance system may comprise: a controller including a display; and a tangible, non-transitory memory configured to communicate with the controller. The tangible, non-transitory memory may have instructions stored thereon that, in response to execution by the controller, cause the controller to perform operations comprising: calculating, by the controller, a first fluid level; generating, by the controller, a first datum corresponding to the first fluid level; receiving, by the shock strut, a fluid in response to the first datum; calculating, by the controller, a second fluid level; generating, by the controller, a second datum; and storing, by the controller, a final fluid level.

In various embodiments, the controller may be in electronic communication with a shock strut servicing monitoring system. An indication may be displayed on the display in response to at least one of the first datum or the second datum. The second datum may be generated in response to the second fluid level being greater than a threshold value. The first fluid level and the second fluid level may correspond to at least one of a volume of a fluid added to a shock strut during service or a number of moles of the fluid added to the shock strut during service. The fluid may comprise at least one of oil or gas.

A method for monitoring a shock strut may include: adjusting, by a controller, at least one of an oil volume and a gas pressure; detecting, by the controller, at least one of an oil volume loss and a gas number of moles loss; and generating, by the controller, a signal corresponding to the at least one of the oil volume loss and the gas number of moles loss.

In various embodiments, the controller may receive the at least one of the oil volume and the gas pressure from a shock strut servicing monitoring system (SSSMS). The adjusting may comprise adjusting to a normalized value. The detecting may include comparison of a desired value with an adjusted value of the at least one of the oil volume and the gas pressure. The signal may be generated by comparing the at least one of the oil volume loss and the gas number of moles loss with a range of threshold values, the range including from 1 to 100 threshold values.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Aircraft landing gear systems in accordance with the present disclosure may comprise a shock strut. A shock strut may comprise various fluids such as oil and gas. Performance of the shock strut may be evaluated by monitoring aspects of the shock strut, including gas temperature, gas pressure, oil pressure, and stroke of the shock strut at various points during operation of the aircraft. Stroke may refer to a shock strut piston position. A servicing assistance system may be used in addition to a monitoring system to calculate oil loss and gas loss within a shock strut. Thus, oil and/or gas may be added to the shock strut during a maintenance process where the monitoring system indicates to ground crew when the shock strut has been filled with the appropriate volume of oil and/or pressure of gas. In various embodiments, landing gear of an aircraft may remain on a fixed surface during the shock strut servicing process without the need to lift the aircraft. The fixed surface may be a runway, a shop floor, the earth, the ground, or the like, for example. In various embodiments, landing gear of an aircraft may be supported by a jack during the shock strut servicing process without the need to lift the aircraft. Hence, independent servicing of oil and gas in a shock strut may be performed and traditional shock strut servicing procedures may be greatly simplified.

As used herein an oil level may refer to a volume of oil. As used herein a gas level may refer to the number of moles of gas.

The following nomenclature corresponds to various equations and parameters described in the present disclosure:

Tunable Parameters:
A: Piston area
$P_{gas,nom}$: Shock strut inflation pressure at 20° C. in the fully extended position
$V_{tot,in-air}$: Shock strut internal volume in the fully extended position
$V_{oil,nom}$: Desired oil volume at 20° C.

Internal Parameters:
i: Counter
$P_{gas,m@20° C.,i}$: Computed pressure adjusted to 20° C. in iteration step 'i'
$P_{gas,m@Tgas}$: Computed pressure (SSSMS direct output)
$P_{gas,m@20° C.}$: Computed pressure adjusted to 20° C. (SSSMS adjusted output)
R: Gas ideal constant
$V_{oil,m@20° C.}$: Computed oil volume adjusted to 20° C. (SSSMS adjusted output)
$V_{oil,m@Tgas}$: Computed oil volume (SSSMS direct output)
dT: Integration step
$\Delta V_{oil@20° C.}$: Oil volume loss adjusted to 20° C.
Z: Gas compressibility index as a function of gas pressure and temperature
$V_{oil,0@Tgas,0}$: Computed oil volume at the onset of servicing
$V_{gas,0@Tgas,0}$: Computed gas volume at the onset of servicing
$\Delta V_{oil-added@Tgas,0}$: Computed oil volume added during servicing
$\Delta V_{oil-added@20C}$: Computed oil volume added during servicing adjusted to 20° C.
$n_0$: Number of moles of gas in the shock strut at the onset of servicing
$\Delta n_{gas,added}$: Number of moles of gas added to the shock strut during servicing Sensor Measurements:
$\hat{T}_{gas}$: Gas temperature
$\hat{T}_{gas,0}$: Gas temperature at the onset of servicing
$\hat{S}$: Shock strut stroke
$\hat{S}_0$: Shock strut stroke at the onset of servicing
$\hat{P}_{gas}$: Shock strut pressure
$\hat{P}_{gas,0}$: Shock strut pressure at the onset of servicing Accordingly, with reference to FIG. 1, a landing gear assembly 100 is illustrated. In various embodiments, landing gear assembly 100 comprises a shock strut 104. Shock strut 104 may be mechanically coupled to a wheel assembly 106. In various embodiments, shock strut 104 may be configured to absorb and dampen forces transmitted by wheel assembly 106 to an aircraft.

Figure 1:
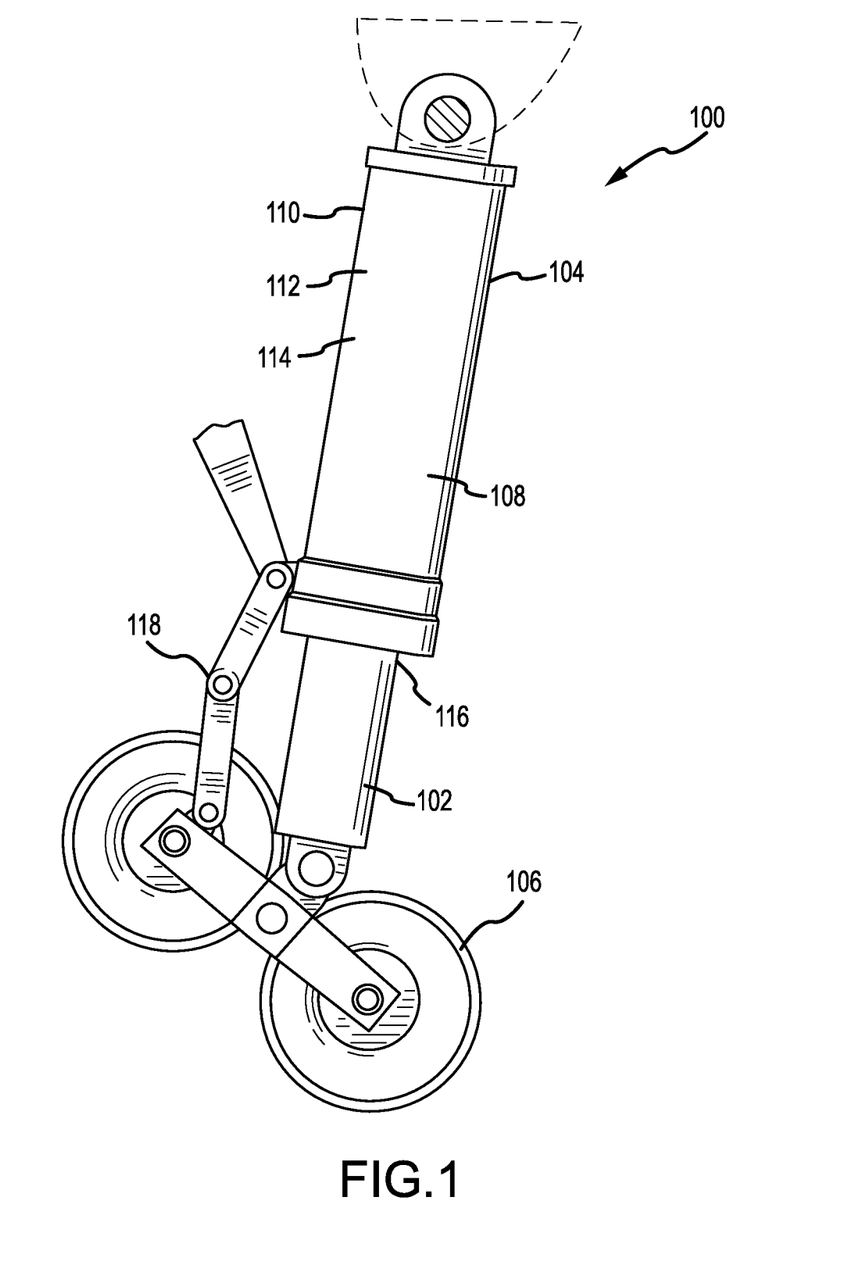
FIG. 1 illustrates a single stage shock strut for use in landing gear of an aircraft, in accordance with various embodiments.

Shock strut 104 may comprise, for example, a piston 102 and a cylinder 108. Cylinder 108 may be configured to receive piston 102 in a manner that allows the two components to telescope together and absorb and dampen forces transmitted by wheel assembly 106.

In various embodiments, a liquid, such as a hydraulic fluid or oil, is located within cylinder 108. Cylinder 108 and piston 102 may, for example, be configured to seal such that liquid contained within cylinder 108 is prevented from leaking as piston 102 translates relative to cylinder 108. Further, cylinder 108 may be configured to contain a gas such as nitrogen gas or air. Shock strut 104 may comprise a proximal end and a distal end, wherein the distal end is opposite the proximal end, the distal end being the end of the shock strut closest to a wheel or wheel assembly of a vehicle, such as wheel assembly 106, for example. The air may be positioned above the oil (referred to as an "air-over-oil" arrangement) or vice versa, where the term "above" in this context means in the direction of the proximal end of the shock strut. Similarly, cylinder 108 and piston 102 may be sealed such that gas is prevented from leaking as piston 102 moves relative to cylinder 108. As such, shock strut 104 may comprise a pressurized environment within cylinder 108.

Shock strut 104 may further comprise, for example, a gas pressure sensor 110. In various embodiments, gas pressure sensor 110 may be capable of measuring the pressure of the gas within shock strut 104 at a desired time. For example, gas pressure sensor 110 may measure the gas pressure within shock strut 104 before, during, or after take-off, or at any point during the duty cycle of shock strut 104.

In various embodiments, shock strut 104 may further comprise, for example, a gas temperature sensor 112. Gas temperature sensor 112 may be capable of measuring the temperature of the gas within shock strut 104 at any point during the duty cycle of shock strut 104.

Similarly, shock strut 104 may comprise an oil pressure sensor 114. In various embodiments, oil pressure sensor 114 may be capable of measuring the pressure of the oil within shock strut 104 at a desired time. For example, oil pressure sensor 114 may measure the oil pressure within shock strut 104 at any point during the duty cycle of shock strut 104.

In various embodiments, shock strut 104 may include various other sensors. Shock strut 104 may include an oil temperature sensor. An oil temperature sensor may be used to measure the temperature of oil inside of shock strut 104. An oil temperature sensor may aide in determining the pressure of oil inside of shock strut 104.

Shock strut 104 may also comprise a position sensor 116. In various embodiments, position sensor 116 may be capable of measuring the position of piston 102 relative to cylinder 108, which is conventionally referred to as the stroke of shock strut 104 at a desired time. Position sensor 116 may be configured to measure the position indirectly, for example, by measuring the orientation of one or more shock strut torque links 118 (or other components). For example, position sensor 116 may measure the stroke of shock strut 104 at any point during the duty cycle of shock strut 104.

Figure 2:
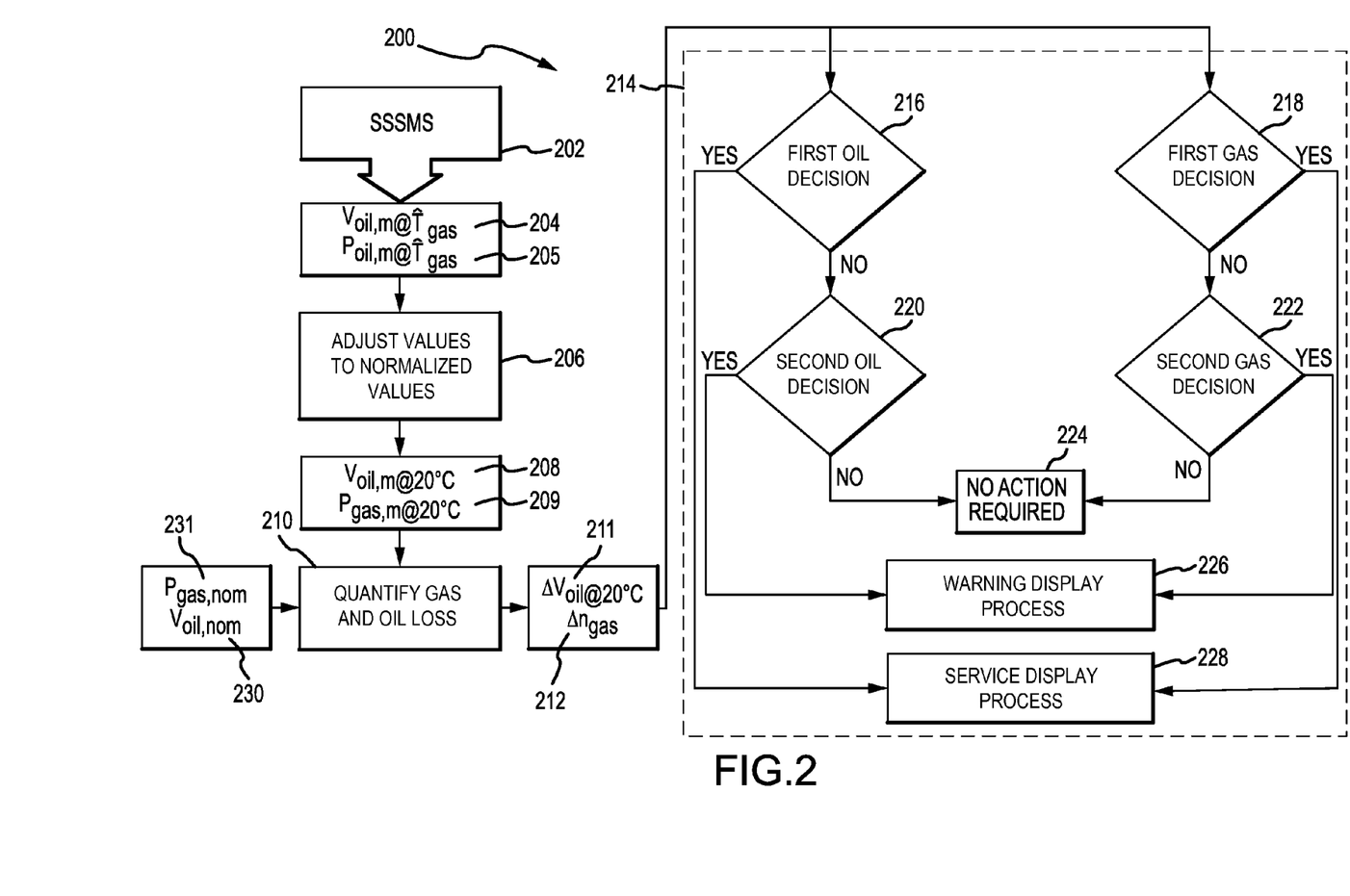
FIG. 2 illustrates a loss detection process, in accordance with various embodiments.

With reference to FIG. 2, loss detection process 200 is illustrated, in accordance with various embodiments. In various embodiments, loss detection process 200 may comprise system program instructions and/or controller instructions. Loss detection process 200 may be located on handheld device 302 of FIG. 3. However, it is contemplated that loss detection process 200 may be located on any controller located on for example, an aircraft or other vehicle. In various embodiments, loss detection process 200 may include normalizing process 206, quantifying process 210, and display process 214. In various embodiments, loss detection process 200 may include shock strut servicing monitoring system (SSSMS) 202. However, in various embodiments, loss detection process 200 and SSSMS 202 may comprise two separate processes, wherein loss detection process 200 receives oil volume 204 and/or gas pressure 205 from SSSMS 202 as one or more inputs.

Figure 7:
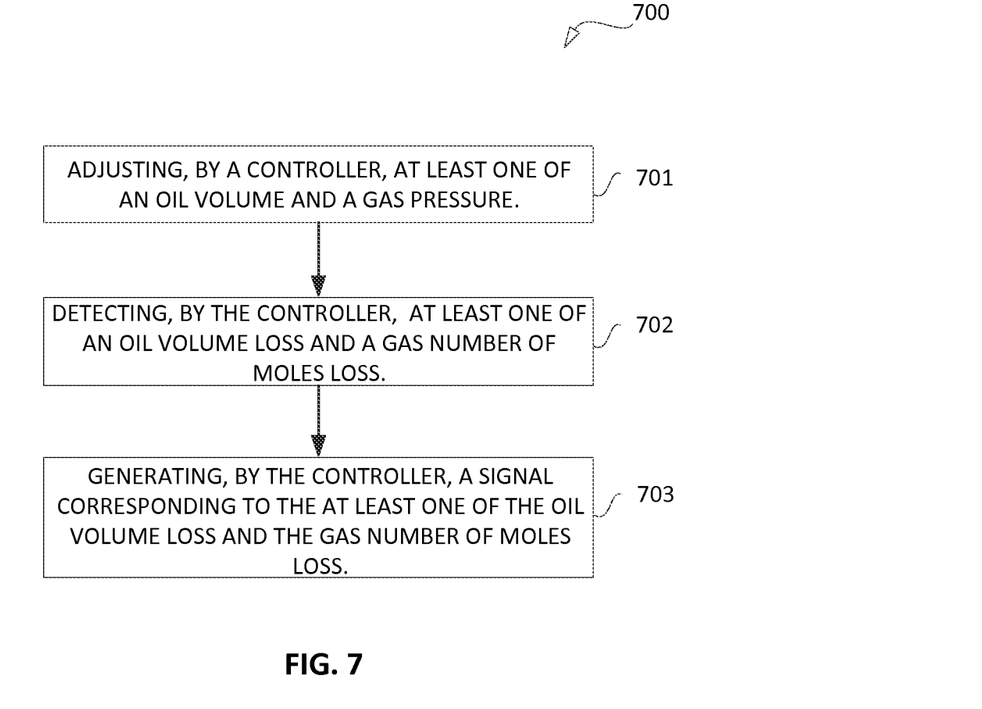
FIG. 7 illustrates a method for monitoring a shock strut, in accordance with various embodiments.

With further reference to FIG. 7, a method 700 for monitoring a shock strut is provided. In various embodiments, shock strut servicing monitoring system (SSSMS) 202 may quantify oil volume 204 and gas pressure 205. Normalizing process 206 may receive oil volume 204 and gas pressure 205 as one or more inputs from SSSMS 202. Normalizing process 206 may use oil volume 204 and gas pressure 205 to calculate normalized oil volume 208 and normalized gas pressure 209 (see step 701). Normalizing process 206 may use equation 1 and equation 2, below, to calculate normalized oil volume 208 and normalized gas pressure 209. As illustrated in FIG. 2, oil volume 204 and gas pressure 205 are adjusted to volume and pressure corresponding to twenty degrees Celsius, respectively. However, it is contemplated that oil volume 204 and gas pressure 205 may be adjusted to any normalized value.

$$V_{oil,m@20° C.} = V_{oil,m@\hat{T}_{gas}}\left(1 + a \times dT \times \text{sign}(20° C. - \hat{T}_{gas})\right)^{\frac{|20° C. - \hat{T}_{gas}|}{dT}} \quad \text{Eq. (1)}$$

Initialization $$\begin{cases} i = 1 \\ P_{gas,m@20° C.,i} = P_{gas,nom}, 20° C. \\ P_{gas,m@20° C.,i+1} = \left(P_{gas,m@\hat{T}_{gas}} + 14.7\right)\frac{V_{tot,in-air} - V_{oil,m@\hat{T}_{gas}}}{V_{tot,in-air} - V_{oil,m@20° C.}} \times \\ \qquad \frac{(20 + 273)}{(\hat{T}_{gas} + 273)} \times \frac{Q(P_{gas,m@20° C.,i}, 20° C.)}{Z(P_{gas,m@\hat{T}_{gas}}, \hat{T}_{gas})} - 14.7 \end{cases}$$

Iteration while $\dfrac{|P_{gas,m@20° C.,i+1} - P_{gas,m@20° C.,i}|}{P_{gas,m@20° C.,i}} \geq 0.001$ $$\begin{cases} i = i + 1 \\ P_{gas,m@20° C.,i+1} = \left(P_{gas,m@\hat{T}_{gas}} + 14.7\right)\frac{V_{tot,in-air} - V_{oil,m@\hat{T}_{gas}}}{V_{tot,in-air} - V_{oil,m@20° C.}} \times \\ \qquad \frac{(20 + 273)}{(\hat{T}_{gas} + 273)} \times \frac{Q(P_{gas,m@20° C.,i}, 20° C.)}{Z(P_{gas,m@\hat{T}_{gas}}, \hat{T}_{gas})} - 14.7 \end{cases}$$

End $$P_{gas,m@20° C.} = P_{gas,m@20° C.,i+1} \quad \text{Eq. (2)}$$

In various embodiments, quantifying process 210 may receive normalized oil volume 208 and normalized gas pressure 209 as one or more inputs. Quantifying process 210 may receive desired oil volume 230 and desired gas pressure 231 as one or more inputs. Desired oil volume 230 and desired gas pressure 231 may refer to a desired oil volume and desired gas pressure, respectfully. Thus, desired gas pressure 231 may correspond with a desired number of moles of gas. Quantifying process 210 may use equation 3 and equation 4 to calculate volume of oil loss (referred to herein as "oil loss") 211 and number of moles of gas loss (referred to herein as "gas loss") 212 (see step 702).

$$\Delta V_{oil@20° C.} = V_{oil,nom} - V_{oil,m@20° C.} \quad \text{Eq. (3)}$$

$$\Delta n_{gas} = \frac{(P_{gas,nom} + 14.7) \times (V_{tot} - V_{oil,nom})}{R \times (20 + 273) \times Z(P_{gas,nom}, 20° C.)} - \quad \text{Eq. (4)}$$

$$\frac{(P_{gas,m@20° C.} + 14.7) \times (V_{tot} - V_{oil,m@20° C.})}{R \times (20 + 273) \times Z(P_{gas,m@20° C.}, 20° C.)}$$

Oil loss 211 may comprise a value which represents the amount of oil that a shock strut has lost since its last servicing. Stated another way, oil loss 211 may comprise a value which represents the difference, in volume of oil, between a desired volume of oil and a current volume of oil in a shock strut. Gas loss 212 may comprise a value which represents the amount of gas that a shock strut has lost since its last servicing. Stated another way, gas loss 212 may comprise a value which represents the difference, in number of moles of gas, between a desired number of moles of gas and a current number of moles of gas in a shock strut.

As illustrated in FIG. 2, display process 214 includes first oil decision 216, second oil decision 220, first gas decision 218, second gas decision 222, no action display process 224, warning display process 226, and service display process 228.

Figure 3:
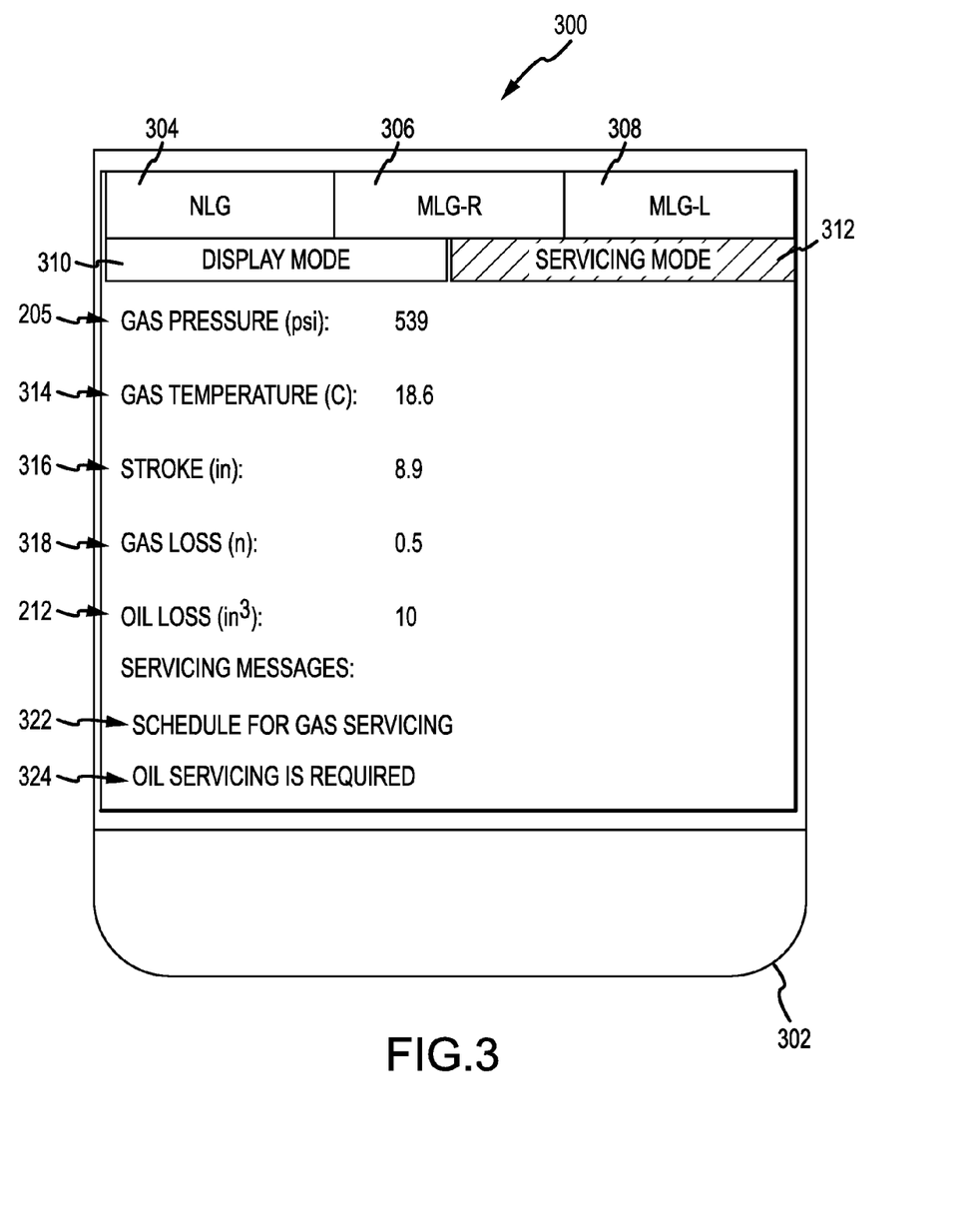
FIG. 3 illustrates an exemplary display in display mode, in accordance with various embodiments.

With reference to FIG. 2 and FIG. 3, display process 214 may be used to generate a display such as, for example, display 300 provided in FIG. 3. First oil decision 216 may determine if oil loss 211 is above a second oil threshold. If oil loss 211 is above the second oil threshold, then service display process 228 may generate a warning signal such as, for example, "oil servicing is required" as illustrated by oil servicing signal 324 in FIG. 3, or the like (see step 703). If oil loss 211 is not above the second oil threshold, then second oil decision 220 may decide if oil loss 211 is above a first oil threshold. If oil loss 211 is above the first threshold, then service display process 226 may generate a warning signal such as, for example, "schedule for oil servicing", or the like. If oil loss 211 is not above the first oil threshold, then no action display process 224 may be configured to not generate any signals, or may be configured to generate a signal indicating the that oil level is acceptable, or the like.

First gas decision 218 may decide if gas loss 212 is above a second gas threshold. If gas loss 212 is above the second gas threshold, then service display process 228 may generate a warning signal such as, for example, "gas servicing is required", or the like (see step 703). If gas loss 212 is not above the second gas threshold, then second gas decision 222 may decide if gas loss 212 is above a first gas threshold. If gas loss 212 is above the first gas threshold, then service display process 226 may generate a warning signal such as, for example, "schedule for gas servicing" as illustrated by gas service signal 322 in FIG. 3, or the like. If gas loss 212 is not above the first gas threshold, then no action display process 224 may be configured to not generate any signals, or may be configured to generate a signal indicating that the gas level is acceptable, or the like.

In accordance with various embodiments, display process 214 may include one or more oil decisions, one or more gas decisions, and one or more display processes. Accordingly, display process 214 may use one or more threshold values to determine the type of display to generate. For example, many threshold values may be used to display a percentage representing the volume of oil and a percentage representing the volume of gas remaining in a shock strut, or the like.

With reference to FIG. 3, display 300 is illustrated, in accordance with various embodiments. As illustrated in FIG. 3, display 300 located on a handheld device 302. However, display 300 may be in any location such as, for example, an aircraft. With momentary reference to FIG. 2, all or part of loss detection process 200 may be located on handheld device 302. Thus, handheld device 302 may include a computer readable medium. Handheld device 302 may comprise a controller.

In various embodiments, display 300 may include various selectable tabs such as selectable tab 304, selectable tab 306, selectable tab 308, selectable tab 310, and selectable tab 312. Selectable tab 310 may be selected to display parameters such as gas pressure 205, gas temperature 314, shock strut stroke 316, gas loss 212, gas service signal 322, oil service signal 324, and the like. With momentary reference to FIG. 2, in various embodiments, gas service signal 322 may be generated in response to a change in gas pressure located in a shock strut. Stated another way, gas service signal 322 may change in response to the value of oil loss 211 and/or gas loss 212 increasing above an oil and/or a gas threshold value. In various embodiments, oil service signal 324 may change in response to a change in oil volume located in a shock strut. Stated another way, oil service signal 324 may change in response to the value of oil loss 211 increasing above an oil threshold value.

Figure 4:
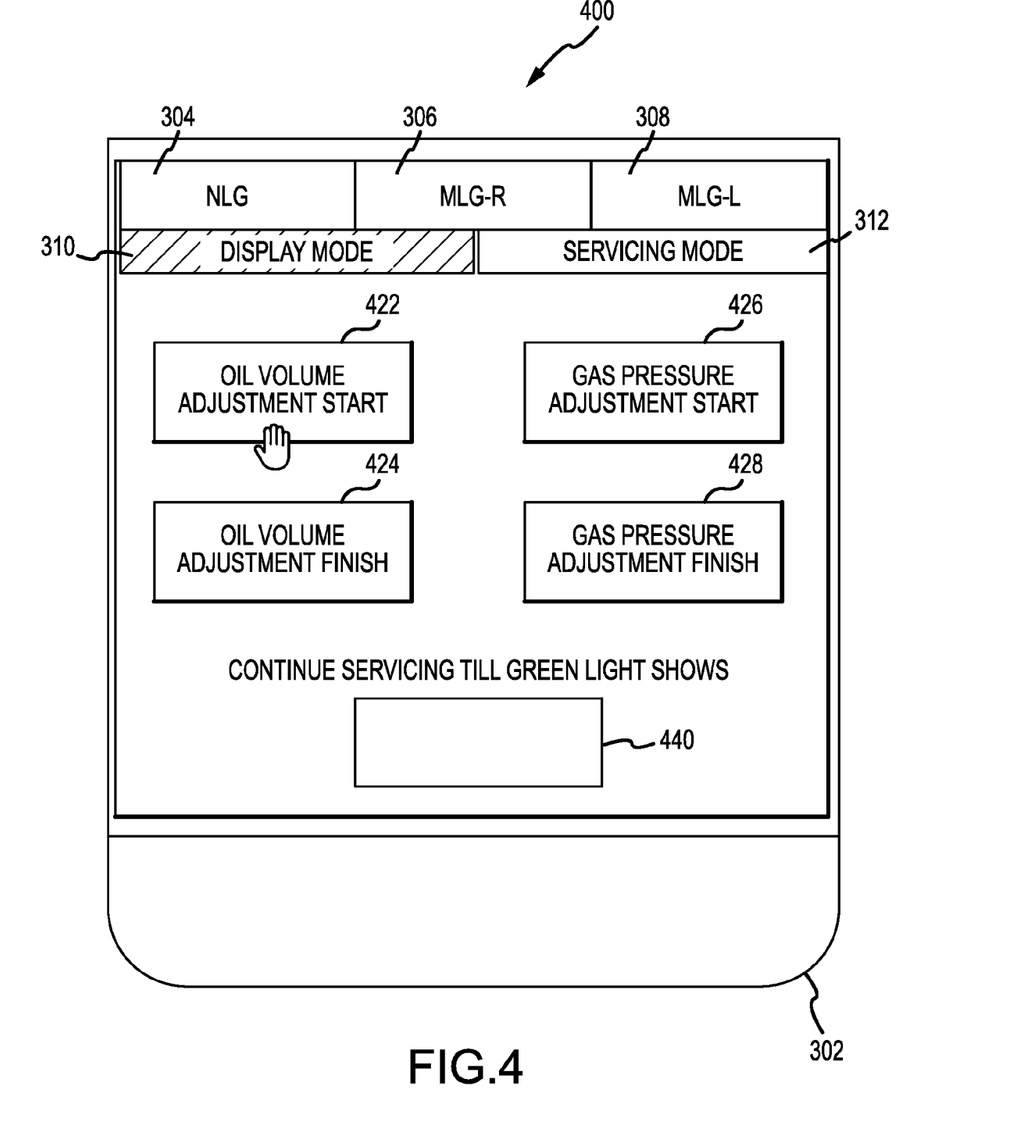
FIG. 4 illustrates an exemplary display in servicing mode, in accordance with various embodiments.

With respect to FIG. 4, elements with like element numbering, as depicted in FIG. 3, are intended to be the same and will not necessarily be repeated for the sake of clarity.

With reference to FIG. 4, display 400 is illustrated, in accordance with various embodiments. Display 400 may be similar to display 300 of FIG. 3. Selectable tab 312 may be selected to display oil and/or gas servicing instructions. As illustrated in FIG. 4, display 400 includes a selectable oil adjustment start tab, a selectable oil adjustment finish tab, a selectable gas adjustment start tab, a selectable gas adjustment finish tab, and an indication signal 440. However, any display may be used to implement the oil and/or gas level adjustment processes as described herein. In various embodiments, the oil level adjustment process may be followed by the gas level adjustment process.

Figure 5:
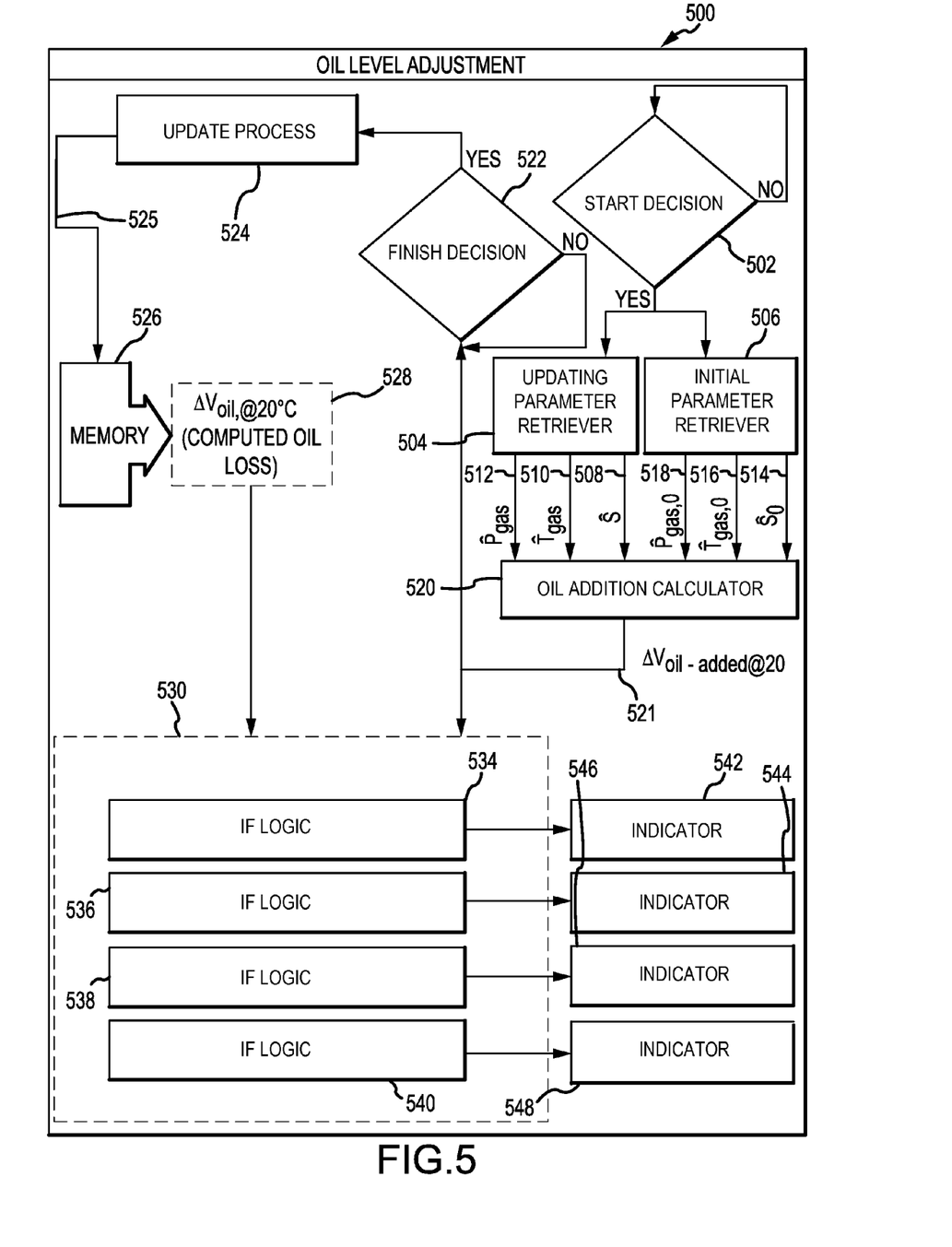
FIG. 5 illustrates an oil level adjustment process, in accordance with various embodiments.
Figure 8:
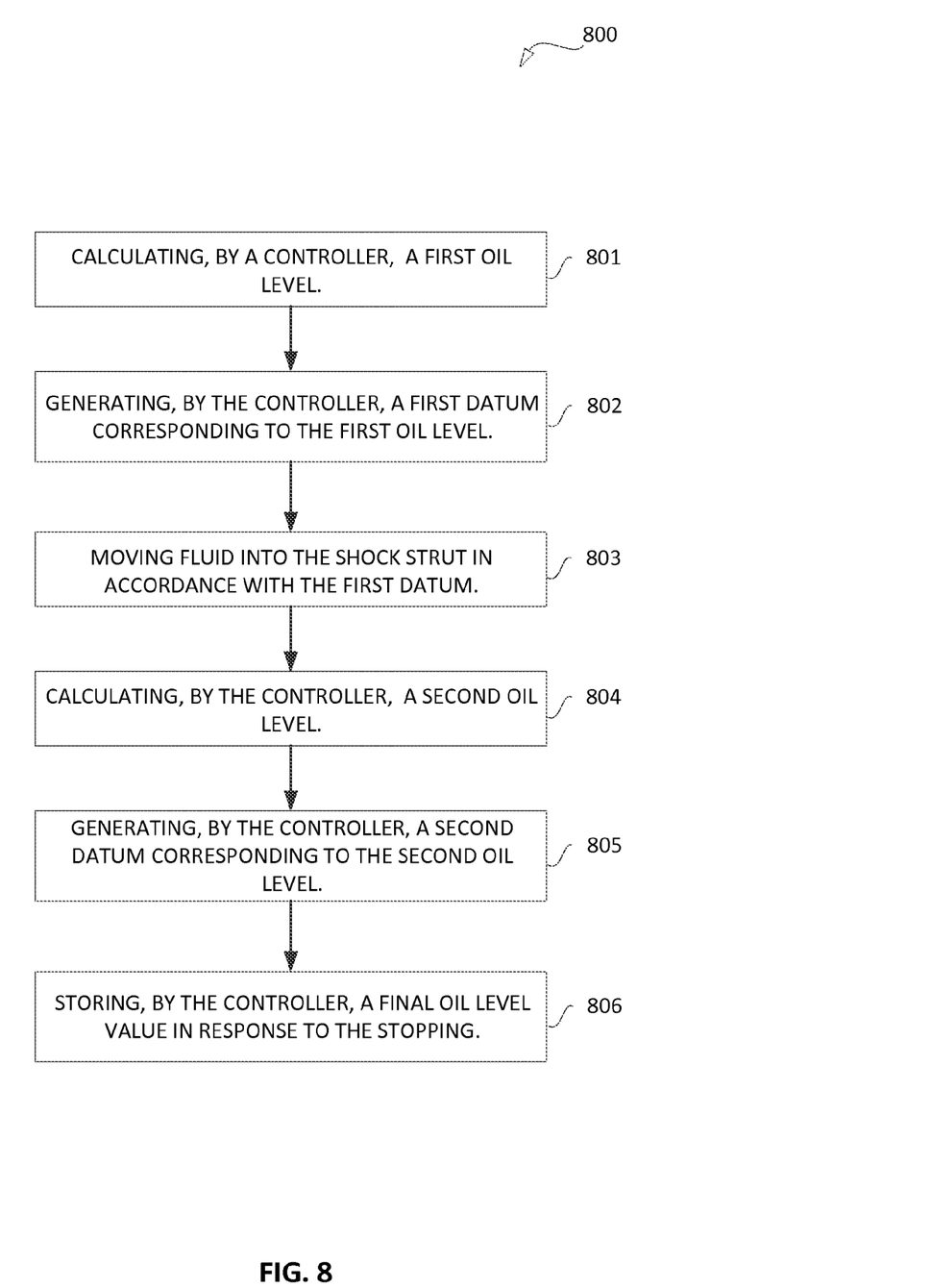
FIG. 8 illustrates a process for servicing oil volume within a shock strut, in accordance with various embodiments.

With further reference to FIG. 8, a method or process 800 for servicing oil volume within a shock strut is provided. With further reference to FIG. 5, selectable start tab 422 may be selected by an operator to start or initiate an oil level adjustment process 500. In various embodiments, oil level adjustment process 500 may comprise system program instructions and/or controller instructions. Oil level adjustment process 500 may be located on handheld device 302. However, it is contemplated that oil level adjustment process 500 may be located on a controller located on an aircraft or other vehicle.

In various embodiments, oil level adjustment process 500 may include start decision 502, oil addition calculator 520, and comparator 530. In various embodiments, oil level adjustment process 500 may include finish decision 522, update process 524, and memory 526. In various embodiments, comparator 530 may include one or more IF logics. As illustrated in FIG. 5, comparator 530 includes first IF logic 534, second IF logic 536, third IF logic 538, and fourth IF logic 540.

Start decision 502 may determine if an operator has indicated to start an oil level adjustment process. For example, an operator may select selectable start tab 422 and in response, start decision 502 may indicate to start oil level adjustment process 500. In various embodiments, oil addition calculator 520 may quantify the volume of oil added to a shock strut in response to start decision 502 being true. Oil addition calculator 520 may receive initial gas pressure 518, initial gas temperature 516, and initial shock strut stroke 514 from initial parameter retriever 506. In various embodiments, initial parameter retriever 506 may acquire initial gas pressure 518, initial gas temperature 516, and initial shock strut stroke 514 from a shock strut servicing monitoring system such as SSSMS 202 (see FIG. 2). However, initial parameter retriever 506 may acquire initial gas pressure 518, initial gas temperature 516, and initial shock strut stroke 514 from any suitable location. Initial parameter retriever 506 may be configured to acquire initial gas pressure 518, initial gas temperature 516, and initial shock strut stroke 514. Initial gas pressure 518, initial gas temperature 516, and initial shock strut stroke 514 may be the gas pressure, gas temperature, and shock strut stroke at the onset of the oil level adjustment process 500, respectively. Oil addition calculator 520 may receive updated gas pressure 512, updated gas temperature 510, and updated shock strut stroke 508 from updating parameter retriever 504. Updating parameter retriever may acquire updated gas pressure 512, updated gas temperature 510, and updated shock strut stroke 508 at a pre-determined rate, such as 10 Hz, for example. Updated gas pressure 512, updated gas temperature 510, and updated shock strut stroke 508 may be the gas pressure, gas temperature, and shock strut stroke, respectively, as measured by the shock strut sensors during the oil level adjustment process 500.

Oil addition calculator 520 may use equation 5 through equation 9 to calculate the volume of added oil (also referred to herein as a first fluid level) 521 to a shock strut (see step 801). Volume of added oil 521 may be the equivalent volume of oil added to a shock strut at a predetermined temperature such as twenty degrees Celsius, for example.

$$V_{oil,0@\hat{T}_{gas,0}} = (V_{oil,nom} - \Delta V_{oil@20°C.}) \qquad \text{Eq. (5)}$$
$$\left(1 + \alpha \times dT \times \text{sign}(\hat{T}_{gas,0} - 20°\text{C.})\right)^{\frac{|20°C.-\hat{T}_{gas,0}|}{dT}}$$

$$V_{gas,0@\hat{T}_{gas,0}} = V_{tot,in-air} - A \times \hat{S}_0 - V_{oil,0@\hat{T}_{gas,0}} \qquad \text{Eq. (6)}$$

$$\frac{V_{gas,0@\hat{T}_{gas,0}}(\hat{P}_{gas,0} + 14.7)}{\hat{T}_{gas,0} \times Z(\hat{P}_{gas,0}, \hat{T}_{gas,0})} = \qquad \text{Eq. (7)}$$
$$\frac{\left(V_{tot,in-air} - A \times \hat{S} - V_{oil,0@\hat{T}_{gas,0}} - \Delta V_{oil-added@\hat{T}_{gas,0}}\right)(\hat{P}_{gas} + 14.7)}{\hat{T}_{gas} \times Z(\hat{P}_{gas}, \hat{T}_{gas})}$$

$$\Delta V_{oil-added@\hat{T}_{gas,0}} = \left(V_{tot,in-air} - A \times S - V_{oil,0@\hat{T}_{gas,0}}\right) - \qquad \text{Eq. (8)}$$
$$\left(\frac{\hat{T}_{gas} \times Z(\hat{P}_{gas}, \hat{T}_{gas})}{(\hat{P}_{gas} + 14.7)} \times \frac{V_{gas,0@\hat{T}_{gas,0}}(\hat{P}_{gas,0} + 14.7)}{\hat{T}_{gas,0} \times Z(\hat{P}_{gas,0}, \hat{T}_{gas,0})}\right)$$

$$\Delta V_{oil-added@20} = \qquad \text{Eq. (9)}$$
$$\Delta V_{oil-added@\hat{T}_{gas,0}}\left(1 + \alpha \times dT \times \text{sign}(20°\text{C.}-\hat{T}_{gas})\right)^{\frac{|20°C.-\hat{T}_{gas}|}{dT}}$$

In various embodiments, comparator 530 may compare added oil 521 with one or more servicing thresholds. Comparator 530 may receive computed oil loss 528 from memory 626. In various embodiments, computed oil loss 528 may be equal to oil loss 211 of FIG. 2. Thus, as an operator adds oil to a shock strut, comparator 530 may actively compare updated added oil 521 with one or more servicing thresholds to indicate to the operator when to stop or slow the process of filling the shock strut with oil as described herein. In various embodiments, added oil 521 may comprise a value, data point, datum, or the like.

Accordingly, as illustrated in FIG. 5, first IF logic 534 may determine if desired oil volume 230 minus oil loss 211 plus added oil 521 is less than or equal to a second oil volume threshold. The volume of oil in the shock strut may be less than a desired volume in response to first IF logic 534 being true. Thus, comparator 530 may generate a datum (also referred to herein as a first datum) in response to first IF logic 534 being true (see step 802). Accordingly, the datum may indicate to an indicator, such as indicator 542 for example, to indicate to an operator to continue adding oil to a shock strut. For example, a datum may comprise a signal, data point, value, or the like which indicates to a controller that first IF logic 534 is true. An indicator 542 may indicate to the operator to continue adding oil to the shock strut in response to first IF logic 534 being true. Thus, a shock strut may receive oil in response to first IF logic 534 being true (see step 803).

As illustrated in FIG. 5, second IF logic 536 may determine if desired oil volume 230 minus oil loss 211 plus added oil 521 is less than or equal to a first oil volume threshold and is greater than the second oil volume threshold. The volume of oil in the shock strut may be less than a desired volume in response to IF logic 536 being true. An indicator 544 may indicate to the operator to continue adding oil to the shock strut in response to second IF logic 536 being true. An indicator 544 may indicate to the operator to continue adding oil to the shock strut at a slower rate in response to second IF logic 536 being true.

As previously mentioned, oil addition calculator 520 may calculate the volume of added oil 521 to a shock strut as oil is added to a shock strut. Accordingly, an updated value of added oil (also referred to herein as a second fluid level) 521 may be calculated by oil addition calculator 520 (see step 804). In various embodiments, the value of added oil 521 may increase as oil is added to a shock strut.

As illustrated in FIG. 5, third IF logic 538 may determine if desired oil volume 230 minus oil loss 211 plus added oil 521 is less than or equal to desired oil volume 230 scaled by a factor such as, for example, 1.02 and is greater than the first oil volume threshold. The volume of oil in the shock strut may be equal to a desired volume in response to third IF logic 538 being true. Thus, comparator 530 may generate a datum (also referred to herein as a second datum) in response to third IF logic 538 being true (see step 805). Accordingly, the datum may indicate to an indicator, such as indicator 546 for example, to indicate to an operator to stop adding oil to a shock strut. An indicator 546 may indicate to the operator to stop adding oil to the shock strut in response to third IF logic 538 being true. Thus, a shock strut may stop from receiving oil in response to third IF logic 538 being true.

As illustrated in FIG. 5, fourth IF logic 540 may determine if desired oil volume 230 minus oil loss 211 plus added oil 521 is greater than desired oil volume 230 scaled by a factor such as, for example, 1.02. The volume of oil in the shock strut may be greater than a desired volume in response to fourth IF logic 540 being true. An indicator 548 may indicate to the operator that the shock strut has been over filled with oil in response to fourth IF logic 540 being true.

An operator may be instructed to stop adding oil to a shock strut at which moment the operator would stop from adding oil to the shock strut in response to third IF logic 538 being true. The operator may then indicate to oil level adjustment process 500 that the oil volume adjustment process is finished by, for example, selecting selectable finish tab 424. Subsequently, finish decision 522 may determine if the finish tab 424 is selected and indicate to update process 524 to update and store a new oil volume (also referred to herein as a final fluid level) 525 to memory 526 (see step 806) in response to finish tab 424 being selected. New oil volume 525 may be calculated by update process 524 by taking desired oil volume 230 minus oil loss 211 plus added oil 521.

In various embodiments, indicator 542, indicator 544, indicator 546, and indicator 548 may be located on display 400 via indicator 440, for example. Thus, indicator 440 may indicate when to stop adding oil to a shock strut. Accordingly, oil level adjustment process 500 may generate an indicator corresponding to added oil 521.

Figure 6:
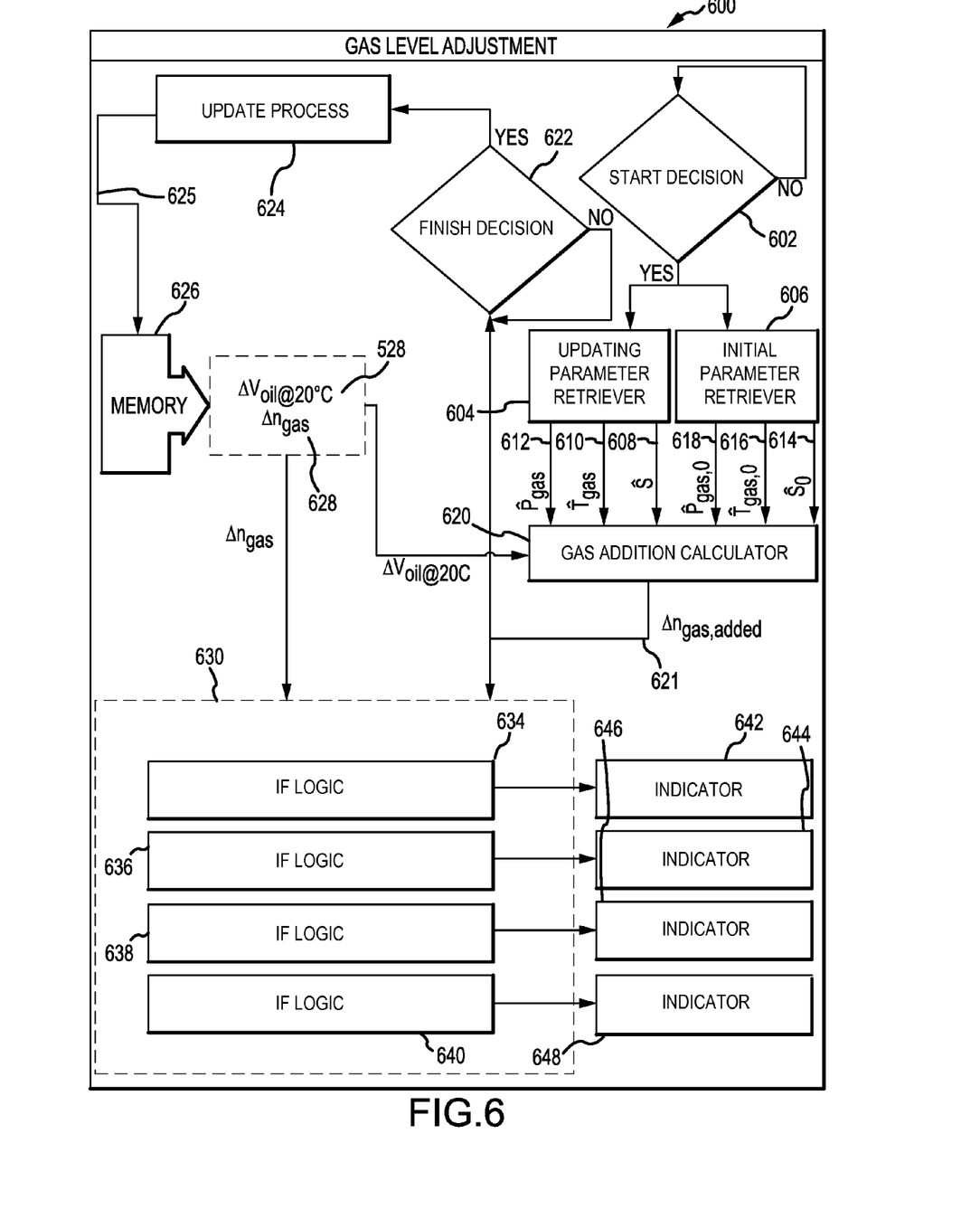
FIG. 6 illustrates a gas level adjustment process, in accordance with various embodiments.
Figure 9:
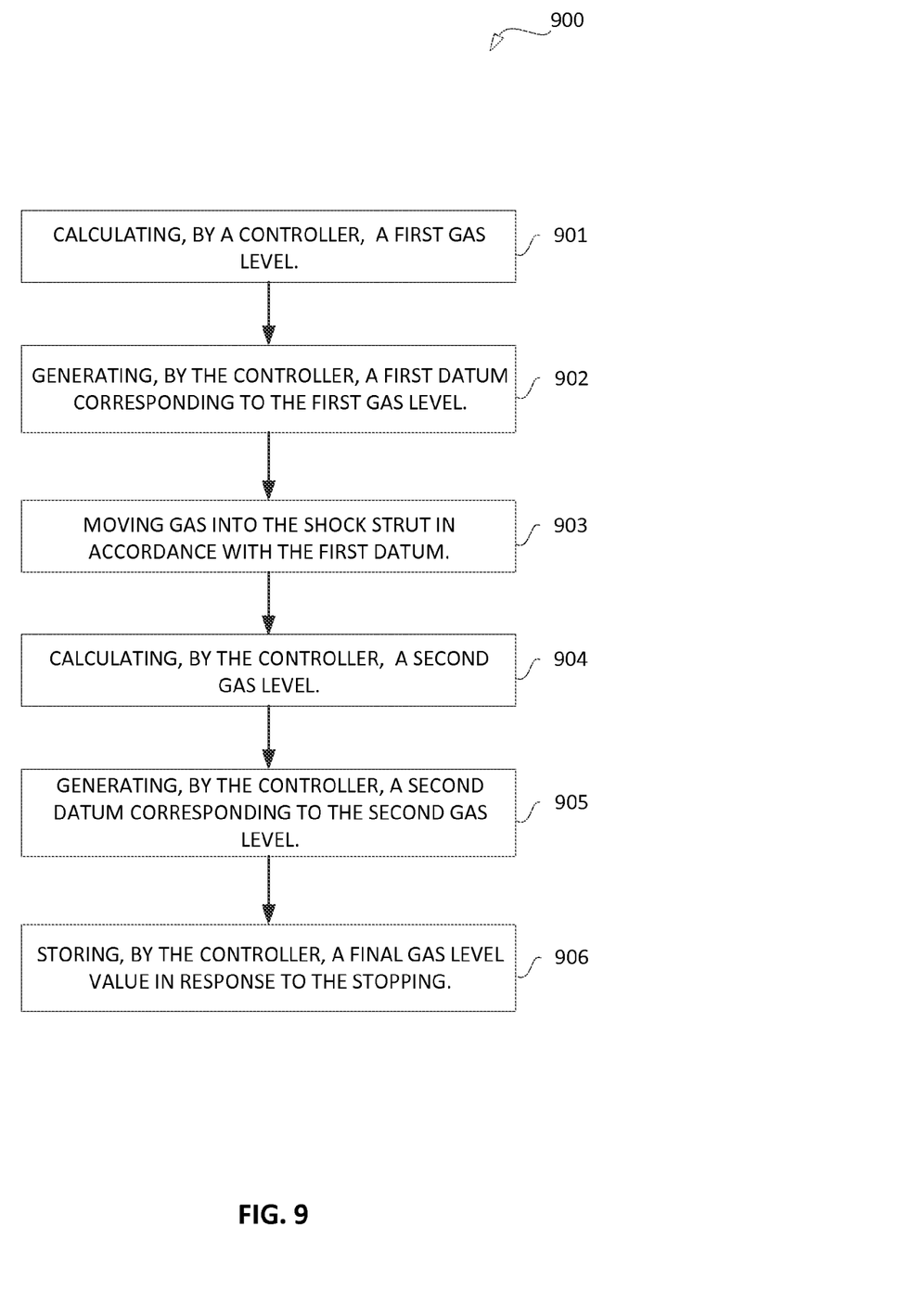
FIG. 9 illustrates a process for servicing gas pressure within a shock strut, in accordance with various embodiments.

With reference to FIG. 9, a method or process 900 for servicing gas within a shock strut is provided. With reference to FIG. 4 and FIG. 6, selectable start tab 426 may be selected by an operator, to start or initiate a gas level adjustment process 600. In various embodiments, gas level adjustment process 600 may comprise system program instructions and/or controller instructions. Gas level adjustment process 600 may be located on handheld device 302. However, it is contemplated that gas level adjustment process 600 may be located on a controller located on an aircraft or other vehicle. In various embodiments, gas level adjustment process 600 may be similar to oil level adjustment process 500.

In various embodiments, gas level adjustment process 600 may include start decision 602, gas addition calculator 620, and comparator 630. In various embodiments, gas level adjustment process 600 may include finish decision 622, update process 624, and memory 626. In various embodiments, comparator 630 may include one or more IF logics. As illustrated in FIG. 6, comparator 630 includes first IF logic 634, second IF logic 636, third IF logic 638, and fourth IF logic 640.

Start decision 602 may determine if an operator has indicated to start a gas level adjustment process. For example, an operator may select selectable start tab 426 and in response, start decision 602 may indicate to start gas level adjustment process 600. In various embodiments, gas addition calculator 620 may quantify the number of moles of gas added to a shock strut in response to start decision 602 being true. Gas addition calculator 620 may receive initial gas pressure 618, initial gas temperature 616, and initial shock strut stroke 614 from initial parameter retriever 606. Initial gas pressure 618, initial gas temperature 616, and initial shock strut stroke 614 may be the gas pressure, gas temperature, and shock strut stroke at the onset of the gas level adjustment process 600, respectively. Gas addition calculator 620 may receive updated gas pressure 612, updated gas temperature 610, and updated shock strut stroke 608 from updating parameter retriever 604. Updating parameter retriever may acquire updated gas pressure 612, updated gas temperature 610, and updated shock strut stroke 608 at a pre-determined rate, such as 10 Hz, for example. Updated gas pressure 612, updated gas temperature 610, and updated shock strut stroke 608 may be the gas pressure, gas temperature, and shock strut stroke, respectively, as measured by the shock strut sensors during the gas level adjustment process 600. Gas addition calculator 620 may use equation 10 through equation 13 to calculate the number of moles of added gas (also referred to herein as a first fluid level) 621 to a shock strut (see step 901).

$$V_{oil,0@\hat{T}_{gas,0}} = (V_{oil,nom} - \Delta V_{oil@20^\circ C.})$$ Eq. (10)

$$\left(1 + a \times dT \times \text{sign}\left(\hat{T}_{gas,0} - 20^\circ \text{ C.}\right)\right)^{\frac{|20^\circ C. - \hat{T}_{gas,0}|}{dT}}$$

$$V_{gas,0@\hat{T}_{gas,0}} = V_{tot,in-air} - A \times \hat{S}_0 - V_{oil,0@\hat{T}_{gas,0}}$$ Eq. (11)

$$n_0 = \frac{\left(\hat{P}_{gas,0} + 14.7\right) \times V_{gas,0@\hat{T}_{gas,0}}}{\hat{T}_{gas,0} \times Z\left(\hat{P}_{gas,0}, \hat{T}_{gas,0}\right) \times R}$$ Eq. (12)

-continued $$\Delta n_{gas,added} = \frac{\left(\hat{P}_{gas} + 14.7\right)\left(V_{gas,0@\hat{T}_{gas,0}} + A \times \left(\hat{S} - \hat{S}_0\right)\right)}{\hat{T}_{gas} \times Z\left(\hat{P}_{gas}, \hat{T}_{gas}\right) \times R} - n_0$$ Eq. (13)

In various embodiments, comparator 630 may compare number of moles of added gas 621 with one or more servicing thresholds. Comparator 630 may receive computed gas loss 628 from memory 626. In various embodiments, computed gas loss 628 may be equal to gas loss 212 of FIG. 2. Thus, as an operator adds gas to a shock strut, comparator 630 may actively compare updated number of moles of added gas 621 with one or more servicing thresholds to indicate to the operator when to stop or slow the process of filling the shock strut with gas as described herein (see step 903 and step 904). In various embodiments, number of moles of added gas 621 may comprise a value, data point, or the like.

Accordingly, as illustrated in FIG. 6, first IF logic 634 may determine if a desired number of moles of gas minus number of moles of gas loss 212 plus number of moles of added gas 621 is less than or equal to a second gas number of moles threshold. The number of moles of gas in the shock strut may be less than a desired level in response to first IF logic 634 being true. Thus, comparator 630 may generate a datum (also referred to herein as a first datum) in response to first IF logic 634 being true (see step 902). Accordingly, the datum may indicate to an indicator, such as indicator 642 for example, to indicate to an operator to continue adding gas to a shock strut. For example, a datum may comprise a signal, data point, value, or the like which indicates to a controller that first IF logic 634 is true. An indicator 642 may indicate to the operator to continue adding gas to the shock strut in response to first IF logic 634 being true. Thus, a shock strut may receive gas in response to first IF logic 634 being true (see step 903).

As illustrated in FIG. 6, second IF logic 636 may determine if a desired number of moles of gas minus number of moles of gas loss 212 plus number of moles of added gas 621 is less than or equal to a first gas level threshold and is greater than the second gas level threshold. The number of moles of gas in the shock strut may be less than a desired level in response to second IF logic 636 being true. An indicator 644 may indicate to the operator to continue adding gas to the shock strut in response to second IF logic 636 being true. An indicator 644 may indicate to the operator to slow the rate at which the operator is adding gas to the shock strut in response to second IF logic 636 being true.

As previously mentioned, gas addition calculator 620 may calculate the number of moles of added gas 621 to a shock strut as gas is added to the shock strut. Accordingly, an updated value of added gas (also referred to herein as a second fluid level) 621 may be calculated by gas addition calculator 620 (see step 904). In various embodiments, the value of number of moles of added gas 621 may increase as gas is added to a shock strut.

As illustrated in FIG. 6, third IF logic 638 may determine if a desired number of moles of gas minus number of moles of gas loss 212 plus number of moles of added gas 621 is less than or equal to a desired number of moles of gas scaled by a factor such as, for example, 1.02 and is greater than the first gas level threshold. The number of moles of gas in the shock strut may be equal to a desired level in response to third IF logic 638 being true. Thus, comparator 630 may generate a datum (also referred to herein as a second datum) in response to third IF logic 638 being true (see step 905).

Accordingly, the datum may indicate to an indicator, such as indicator 646 for example, to indicate to an operator to stop adding gas to a shock strut. An indicator 646 may indicate to the operator to stop adding gas to the shock strut in response to third IF logic 638 being true. Thus, a shock strut may stop from receiving gas in response to third IF logic 638 being true.

As illustrated in FIG. 6, fourth IF logic 640 may determine if a desired number of moles of gas minus number of moles of gas loss 212 plus number of moles of added gas 621 is greater than a desired number of moles of gas scaled by a factor such as, for example, 1.02. The number of moles of gas in the shock strut may be greater than a desired level in response to fourth IF logic 640 being true. An indicator 648 may indicate to the operator that the shock strut has been over filled with gas in response to fourth IF logic 640 being true.

An operator may be instructed to stop adding gas to a shock strut at which moment the operator would stop from adding gas to the shock strut in response to third IF logic 638 being true. The operator may then indicate to gas level adjustment process 600 that the gas volume adjustment process is finished by, for example, selecting selectable finish tab 428. Subsequently, finish decision 622 may determine if the finish tab 428 is selected and indicate to update process 624 to update and store a new gas number of moles (also referred to herein as a final fluid level) 625 to memory 626 (see step 906) in response to finish tab 428 being selected. New gas number of moles 625 may be calculated by taking a desired number of moles of gas minus number of moles of gas loss 212 plus number of moles of added gas 621.

In various embodiments, indicator 642, indicator 644, indicator 646, and indicator 648 may be located on display 400 via indicator 440, for example. Thus, indicator 440 may indicate when to stop adding gas to a shock strut. Accordingly, gas level adjustment process 600 may generate an indicator corresponding to number of moles of added gas 621.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A process for servicing a shock strut including:
   calculating, by a controller, a first fluid level at a first time based upon at least an initial gas pressure, an initial gas temperature, and an initial shock strut stroke position;
   generating, by the controller, a first datum corresponding to the first fluid level;
   sending, by the controller, the first datum to a display;
   moving fluid into the shock strut in accordance with the first datum;
   receiving, by the controller, an updated gas pressure, an updated gas temperature, and an updated shock strut stroke position from a plurality of shock strut sensors, in accordance with the fluid moved into the shock strut;
   calculating, by the controller, a second fluid level at a second time based upon at least the initial gas pressure, the initial gas temperature, the initial shock strut stroke position, the updated gas pressure, the updated gas temperature, and the updated shock strut stroke position;
   generating, by the controller, a second datum corresponding to the second fluid level;
   storing, by the controller, a final fluid level; and
   sending, by the controller, the second datum to a display.

2. The process of claim 1, wherein the fluid comprises at least one of oil or gas.

3. The process of claim 1, wherein at least one of the calculating the first fluid level, generating the first datum, calculating the second fluid level, generating the second datum, or storing the final fluid level is performed by a controller.

4. The process of claim 1, wherein the generating the first datum is in response to at least one of a fluid volume loss or a fluid number of moles loss being more than or equal to a threshold value.

5. The process of claim 1, wherein the process for servicing the shock strut allows for independent servicing of a gas in the shock strut and an oil in the shock strut.

6. The process of claim 1, wherein the storing the final fluid level is in response to the second datum.

7. The process of claim 1, wherein the final fluid level is calculated using at least one of a desired fluid level, the second fluid level, and a fluid level loss.

8. The process of claim 1, wherein a landing gear of an aircraft on which the shock strut is mounted is supported by at least one of a fixed surface or a jack during the process for servicing the shock strut.

9. The process of claim 1, further comprising comparing the first fluid level with a computed fluid level loss, wherein the generating the first datum is based upon the comparing.

\* \* \* \* \*